US008662991B2

(12) United States Patent
Harari

(10) Patent No.: US 8,662,991 B2

(45) Date of Patent: Mar. 4, 2014

(54) SYSTEM FOR COMPUTERIZED REEL-BASED GAMING AND A METHOD OF OPERATING THEREOF

(75) Inventor: Sagi Harari, Tel Aviv (IL)

(73) Assignee: Playtech Software Limited (IM)

( * ) Notice: Subject to any disclaimer, the term of this patent is extended or adjusted under 35 U.S.C. 154(b) by 0 days.

(21) Appl. No.: 13/518,702

(22) PCT Filed: Dec. 5, 2010

(86) PCT No.: PCT/IL2010/001027

§ 371 (c)(1),
(2), (4) Date: Jun. 22, 2012

(87) PCT Pub. No.: WO2011/077426

PCT Pub. Date: Jun. 30, 2011

(65) Prior Publication Data

US 2012/0258784 A1 Oct. 11, 2012

Related U.S. Application Data

(60) Provisional application No. 61/290,076, filed on Dec. 24, 2009.

(51) Int. Cl.
*A63F 9/24* (2006.01)
*A63F 13/00* (2006.01)

(52) U.S. Cl.
USPC .................... 463/20; 463/21; 463/25; 463/26

(58) Field of Classification Search
USPC ............................................................ 463/20
See application file for complete search history.

(56) References Cited

U.S. PATENT DOCUMENTS

| | | | | | |
|---|---|---|---|---|---|
| 4,669,731 | A | * | 6/1987 | Clarke | 463/20 |
| 5,695,402 | A | * | 12/1997 | Stupak | 463/20 |
| 5,910,048 | A | * | 6/1999 | Feinberg | 463/25 |
| 6,024,642 | A | * | 2/2000 | Stupak | 463/20 |
| 6,113,493 | A | * | 9/2000 | Walker et al. | 463/25 |
| 7,393,279 | B2 | * | 7/2008 | Walker et al. | 463/25 |
| 7,452,272 | B2 | * | 11/2008 | Walker et al. | 463/20 |
| 8,105,155 | B2 | * | 1/2012 | Kelly et al. | 463/25 |
| 8,142,280 | B2 | * | 3/2012 | Walker et al. | 463/25 |
| 2004/0002377 | A1 | * | 1/2004 | Staw et al. | 463/25 |
| 2004/0102238 | A1 | * | 5/2004 | Taylor | 463/16 |
| 2008/0220839 | A1 | | 9/2008 | DeBrabander et al. | |
| 2009/0124347 | A1 | | 5/2009 | Rodgers et al. | |
| 2009/0227354 | A1 | | 9/2009 | Johnson | |
| 2009/0227356 | A1 | | 9/2009 | Moroney | |

* cited by examiner

*Primary Examiner* — Steven J Hylinski
(74) *Attorney, Agent, or Firm* — Oliff PLC

(57) ABSTRACT

There is provided a computerized reel-based gaming system configured to return at least part of a player's credits back to the player when at least one pre-defined combination of symbols has not been winning after a certain number N of spins of the reels. The method of operating the gaming system comprises: a) responsive to a spin of the reels, automated obtaining a result of matching between the spin output corresponding to a cash-back combination and a winning cash-back combination, thus, in case of a mismatch, giving rise to a non-winning event; b) automated assessing a number of consecutive non-winning events with respect to the cash-back combination; and c) automated initiating a cash-back award once the number of consecutive non-winning events reaches a cash-back triggering number corresponding to the cash-back combination.

20 Claims, 6 Drawing Sheets

Cash-Back presentation meter (401)

Cash-Back presentation meter (401)

SYSTEM FOR COMPUTERIZED REEL-BASED GAMING AND A METHOD OF OPERATING THEREOF

FIELD OF THE INVENTION

The present invention generally relates to computerized gaming, and more particularly to computerized reel-based games.

BACKGROUND OF THE INVENTION

Reel-based games implemented on land-based gaming machines (e.g. slot machines, video gaming machines, etc.) and/or online are well known in Prior Art.

Computerized reel-based games may be implemented in various ways known in the art as disclosed, for example, in the following patent applications:

U.S. Patent Application No. 2008/220839 (DeBrabander et al.) discloses methods and systems for providing a video slot machine game of chance. A video slot machine may use M-reels to play an N-reel game, where M is greater than N, or may use any field of play larger than necessary to determine a payout outcome of the game. For example, nine reels may be used to play a multi-line five reel video slot game. The reels may be selected by an N-reel wide frame that slides back and forth over the available reels. In some embodiments, reels on one side of the screen pay at a higher rate than reels on the other side of the screen, or pay rates of reels gradually increase or decrease from one end of the visually displayed reels to the other.

U.S. Patent Application No. 2009/227356 (Moroney) discloses a method for use with a gaming machine arranged to provide a spinning reel game in which symbols are spun up on a plurality of reels to form at least one outcome and, if a winning outcome occurs, the gaming machine awards an award. The method includes (a) if at least one specified symbol is spun up and displayed in a resultant position on a reel, holding the specified symbol in the resultant position for at least one further game in which at least the reel carrying the specified symbol is re-spun; and (b) awarding the award if a winning outcome occurs, wherein a specified symbol comprising part of a winning outcome has the effect of increasing the award if the specified symbol is adjacent at least one other specified symbol.

U.S. Patent Application No. 2009/227354 (Johnson) discloses methods and apparatus, including computer program products, implementing and using techniques for playing a spinning reel game on a gaming device. A selection is received from a player of one or more paylines among several paylines that the player thinks will contain a winning reel symbol combination at the end of the game. The gaming device selects one or more paylines among the paylines that will have a winning reel symbol combination at the end of the game. At the end of the game it is determined whether at least one payline selected by the player matches at least one payline selected by the gaming device.

U.S. Patent Application No. 2009/124347 (Rodgers et al.) discloses a gaming system, gaming device and method of a reel game that includes stacks of symbols configured on the reels to provide a large number of winning symbol combinations. The gaming device includes a plurality of reels wherein each reel includes a reel-strip and a plurality of symbols. Each of the plurality of reels is configured to include one or more stacks of symbols wherein a stack of symbols is formed by placing a plurality of identical symbols adjacent to each other on a single reel. If two non-adjacent reels each generated a stack of identical symbols and at least one reel positioned between the two non-adjacent reels generated symbols different from the symbols used to form the stack of identical symbols, at least one symbol on the at least one reel positioned between the two non-adjacent reels is modified into the symbol that forms the stacks of identical symbols.

SUMMARY OF THE INVENTION

In accordance with certain aspects of the presently disclosed subject matter, there is provided a computerized reel-based gaming system configured to return at least part of a player's credits back to the player when at least one pre-defined combination of symbols has not been winning after a certain number N of spins of the reels.

In accordance with certain aspects of the presently disclosed subject matter, there is provided a method of operating a computerized reel-based gaming system, the method comprising: a) responsive to a spin of the reels, automated obtaining a result of matching between the spin output corresponding to a cash-back combination and a winning cash-back combination, thus, in a case of a mismatch, giving rise to a non-winning event; b) automated assessing a number of consecutive non-winning events with respect to the cash-back combination; and c) automated initiating a cash-back award once the number of consecutive non-winning events reaches a cash-back triggering number corresponding to the cash-back combination.

Assessing the number of consecutive non-winning events with respect to the cash-back combination can comprise a) assigning to the cash-back combination a meter configured to measure the number of consecutive non-winning events with respect to the cash-back combination; b) increasing a value of the meter responsive to a non-winning event with respect to the cash-back combination; and c) resetting the meter responsive to a winning event with respect to the given cash-back combination or upon initiating the cash-back award.

Obtaining the result of matching and assessing the number of consecutive non-winning events can be provided responsive to each spin of the reels. It can be provided for a plurality of cash-back combination, while initiating the cash-back award can be provided once the number of consecutive non-winning events corresponding to at least one cash-back combination reaches a respective cash-back triggering number. Optionally, obtaining the result of matching can be provided by receiving information indicative of a non-winning event which occurred in the basic operation of the reel game.

Optionally, at least one cash-back combination can be "any line" among a certain set of lines, and respective assessing the number of consecutive non-winning events can be provided for each line in the set. Alternatively or additionally, at least one cash-back combination can be "any combination of pre-defined number of reels", and respective assessing the number of consecutive non-winning events can be provided for all combinations of a pre-defined number of reel outputs.

In accordance with other aspects of the presently disclosed subject matter, there is provided a computerized reel-based gaming system comprising: a) a reel interface configured to obtain, responsive to a spin of the reels, a result of matching between the spin output corresponding to a cash-back combination and a winning cash-back combination, thus, in case of a mismatch, giving rise to a non-winning event; b) a metering unit operatively coupled to the reel interface and configured to assess a number of consecutive non-winning events with respect to the cash-back combination, and to initiate a cash-back award once the number of consecutive non-winning events reaches a cash-back triggering number corresponding to the cash-back combination. The metering unit can further comprise at least one meter configured: a) to increase its value responsive to a non-winning event with respect to the cash-back combination; and b) to reset the value responsive to a winning event with respect to the given cash-back combination or upon initiating the cash-back award. Optionally, the metering unit can comprise a plurality of meters, each meter assigned to a certain pre-defined cash-back combination. Optionally, the metering unit can be configured to receive from the reel interface result of matching, and to assess the number of consecutive non-winning events responsive to each spin of the reels.

The metering unit can be configured to assess the number of consecutive non-winning events for a plurality of cash-back combinations, and to initiate the cash-back award once the number of consecutive non-winning events corresponding to at least one cash-back combination reaches a respective cash-back triggering number.

The reel interface can be configured to receive information indicative of a non-winning event which occurred in the basic operation of the reel game, thereby obtaining the result of matching between the spin output corresponding to the cash-back combination and the winning cash-back combination.

Optionally, at least one cash-back combination can be "any line" among a certain set of lines, and the metering unit can be configured to assess the number of consecutive non-winning events for each line in the set.

Optionally, at least one cash-back combination can be "any combination of a predefined number of reels", and the metering unit can be configured to assess the number of consecutive non-winning events for all combinations of a pre-defined number of reel outputs.

In accordance with other aspects of the presently disclosed subject matter, there is provided a cash-back unit for use in conjunction with a computerized reel-based gaming system, the cash-back unit comprising: a) a configuration unit accommodating data characterizing to at least one cash-back configuration and at least one winning cash-back combination; b) a reel interface configured to obtain, responsive to a spin of the reels of the gaming system, a result of matching between the spin output corresponding to the at least one cash-back combination and to the at least one winning cash-back combination, thus, in case of a mismatch, giving rise to a non-winning event; c) a metering unit operatively coupled to the reel interface and configured to assess a number of consecutive non-winning events with respect to the cash-back combination, and to initiate a cash-back award to be provided by the gaming system once the number of consecutive non-winning events reaches a cash-back triggering number corresponding to the cash-back combination. The metering unit can be further configured: a) to increase its value responsive to a non-winning event with respect to the cash-back combination; and b) to reset its value responsive to a winning event with respect to the given cash-back combination or upon initiating the cash-back award. The metering unit can comprise a plurality of meters, each meter being assigned to a certain pre-defined combination.

The cash-back unit can further comprise a presentation interface operatively coupled to the metering unit and configured to enable the gaming system to display the assessing results and/or derivatives thereof.

The reel interface can be configured to receive from the game system information indicative of a non-winning event which occurred in the reel game, thereby obtaining the result of matching between the spin output corresponding to the cash-back combination and the winning cash-back combination.

Among advantages of certain embodiments of the presented subject matter is capability of the gaming system to award the player responsive to a pre-defined number of certain non-winning events.

BRIEF DESCRIPTION OF THE DRAWINGS

In order to understand the invention and to see how it may be carried out in practice, certain embodiments will now be described, by way of non-limiting example only, with reference to the accompanying drawings, in which.

DETAILED DESCRIPTION OF EXEMPLARY EMBODIMENTS

Figure 1:
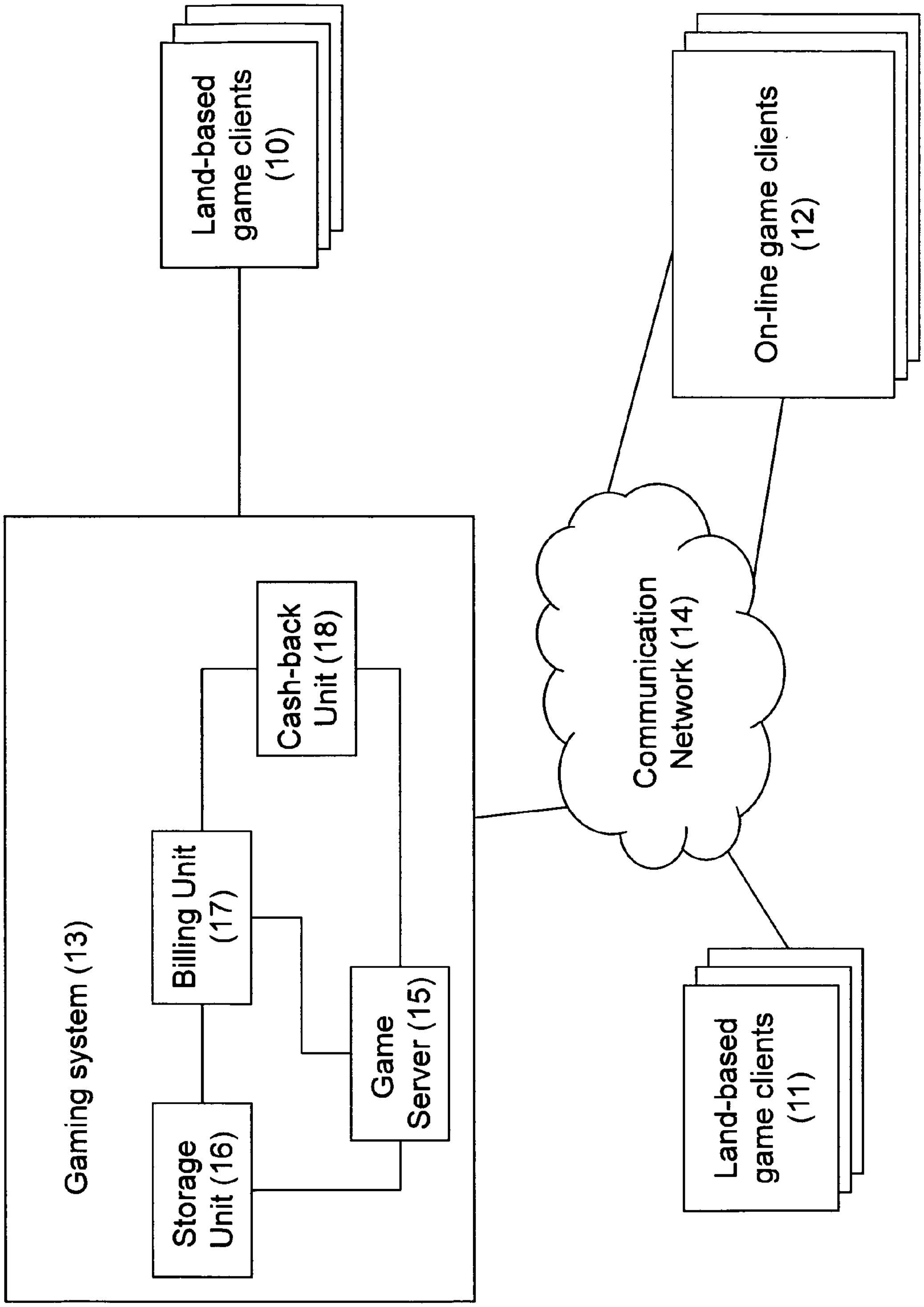
FIG. 1 is a generalized functional block diagram illustrating an example of a computerized reel-based game system in accordance with the presently disclosed subject matter.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and description, identical reference numerals indicate those components that are common to different embodiments or configurations.

Unless specifically stated otherwise, as apparent from the following discussions, it is appreciated that throughout the specification discussions utilizing terms such as "processing", "analyzing", "calculating", "matching", "generating", "setting", "configuring" or the like, refer to the action and/or processes of a computer that manipulate and/or transform data into other data, said data represented as physical, e.g. such as electronic, quantities and/or said data representing the physical objects. The term "computer" should be expansively construed to cover any kind of electronic device with data processing capabilities.

The operations in accordance with the teachings herein may be performed by a computer specially constructed for the desired purposes or by a general-purpose computer specially configured for the desired purpose by a computer program stored in a computer readable storage medium.

In addition, embodiments of the presently disclosed subject matter are not described with reference to any particular programming language. It will be appreciated that a variety of programming languages may be used to implement the teachings of the presently disclosed subject matter.

The references cited in the background teach many principles of implementing and managing computerized reel-based gaming machines and methods of operating thereof that are applicable to the present invention. Therefore the full contents of these publications are incorporated by reference herein for appropriate teachings of additional or alternative details, features and/or technical background.

The term "criterion" used in this patent specification should be expansively construed to include any compound criterion, including, for example, several criteria and/or their logical combinations.

Bearing this in mind, attention is drawn to FIG. 1 illustrating an exemplified computerized reel-based gaming system in accordance with the presently disclosed subject matter. The gaming system 13 is operatively coupled to a plurality of land-based game terminals 10, 11 and online game clients 12. The land-based game terminals can be connected to the gaming system directly or via a communication network 14 (e.g. Wireline or Wireless Public Telephone Networks, Internet, Intranet, cable network, etc.). The online game clients can be associated with any device having input and display capabilities (e.g. personal computer, workstation, PDA, mobile phone, WebTV device, wagering machine, adaptive gaming machine, etc.) and capable to communicate with the game system 13 directly or via communication network 14. Optionally, such a device can be further capable of video capturing and/or audio input/output capabilities.

The online game clients can be downloaded to the respective devices and/or accessed with the help of such devices from the web via a web browser. In certain embodiments of the invention the device can be also capable to execute at least part of a gaming application. In certain embodiments of the invention the game clients can be associated with land-based gaming terminals 10, 11 and/or with the game system itself (e.g. a game system in a land-based casino can support one or more directly associated clients).

In certain embodiments of the system there can be provided an exchange of live video/audio inputs between the clients (and/or associated devices) and the gaming system. The display capabilities of the devices can include capabilities of showing a video image of the other players and/or dealer.

For purpose of illustration only, the following description is made with respect to online game clients. Those skilled in the art will readily appreciate that the teachings of the presently disclosed subject matter are not bound by these online game clients and are applicable in a similar manner to land-based clients operatively coupled to the game system and/or any combination of online clients and land-based clients and/or to a game system implemented in a land-based casino. In certain embodiments, the game system of the presently disclosed subject matter can be partly or fully integrated with one or more gaming terminals.

The reel-based game system 13 comprises a gaming server 15 configured to receive input data from one or more game clients, to execute logic of one or more certain games accordingly, and to report outcome(s) to the game clients in accordance with gaming principles and rules. By way of non-limiting example, server 15 can be configured as a server-side of a gaming application, wherein each gaming client may be configured to execute the corresponding client-side. The sharing of functions between the game server and the game clients may vary depending on the game and implementation thereof, for example the game client can provide only functions of input/output and/or additionally execute certain programs related to output graphics and/or additionally execute part or all programs related to a game logic and exchange the data with the game server, etc.

Reel-based games (e.g. slot games with single and multiple slots, lotto games, etc.) are based on randomly displaying several symbols from a pre-determined set of symbols and on determining a game outcome which depends on matching the resulted combination(s) of symbols to a winning combination pre-defined in the game configuration and/or selected by a player. The combination of symbols used for a winning/non-winning decision can be configured as symbols comprised in one or more lines or defined otherwise. A reel-based gaming system can be implemented as a video machine where the selected symbols are displayed as virtual reels or may be visualized on a graphical display device in any other suitable way. The rotation (spin) of reels can be simulated with the help of a random number generator or in any other suitable way.

The game system further comprises a storage unit 16 operatively coupled to the game server 15. The storage unit is configured to accommodate all necessary information related to the games and users, including configuration of the game server (e.g. available games, game limits, etc.), user-related data and profiles, subscription management data (e.g. data related to opening an account for a user, closing an account, allowing a user to add or withdraw funds from an account, changing the user's address or personal identification number, etc.), session histories, detailed game results, monetary transactions data, statistical data, etc. By way of non-limiting example, user-related data can include the user's name, address, age, gender, marital status, number of children, salary, occupation, hobbies and preferences or any other personal data. Additionally, user-related data can include data related to the gaming of certain users, for example, number and sums of wagers during the former week, favorite fields of games, sum of money won, bonuses, etc.

The gaming system can comprise other servers (not shown) operatively coupled to the storage unit 16, as, by way of non-limiting example, a security server, administration server, live game server and others. The servers are configured to exchange data with the storage unit 16 and/or gaming server 15. The functions of the servers can be provided in hardware, software, firmware or any suitable combination thereof.

The game system further comprises a billing unit 17 operatively coupled to the game server 15 and the storage unit 16. In certain embodiments of the system the billing unit can be also operatively coupled to the game clients. The billing unit is configured to accommodate and manage user accounts and to enable performing of monetary transactions in accordance with data received from the game server, the storage unit and, optionally, the user.

In accordance with the presently disclosed subject matter, the gaming system further comprises a cash-back unit 18 operatively coupled to the game server and, optionally, to the billing unit. As further detailed with reference to FIGS. 2-3, the cash-back unit is operable to enable a cash-back function, i.e. to return at least a part of a player's credits back to the player when at least one combination of symbols pre-defined for cash-back function has not been winning after a certain number N of spins of the reels.

By way of non-limiting example, the cash-back function can be implemented for slot game machines. During basic operation of a typical slot game, the awards (e.g. payments, promotions, etc.) are provided responsive to winning events, i.e. matching one or more specific reel lines to pre-defined winning set of symbols. The amount of lines can vary between 1 line to 100 and more. At each spin the player bets on selected lines a specific amount of credits. By way of non-limiting example, if the player puts an equal bet on each line, the total bet of each spin can be calculated as the total number of lines multiplied by the bet per each line.

In accordance with certain embodiments of the presently disclosed subject matter and by way of non-limiting example, the amount of credits the player gets back can be equal to the total bets per line×predefined number N of non-winning spins of certain lines×Y multiplier, N and Y can be configured per game, a certain combination of symbols, personalized for a certain group of players (e.g. VIP), depending on certain gaming events, and/or otherwise defined.

Those versed in the art will readily appreciate that the invention is not bound by the architecture detailed with reference to FIG. 1. Likewise, the cash-back unit and/or parts thereof can be implemented as a block (logical and/or physical) integrated with the game server and/or with other servers of the game system. Alternatively, the cash-back unit can be implemented as an external unit to be used in conjunction with the reel-based game system (e.g. with a stepper machine provided with reels with each reel carrying several symbols of the set).

Figure 2:
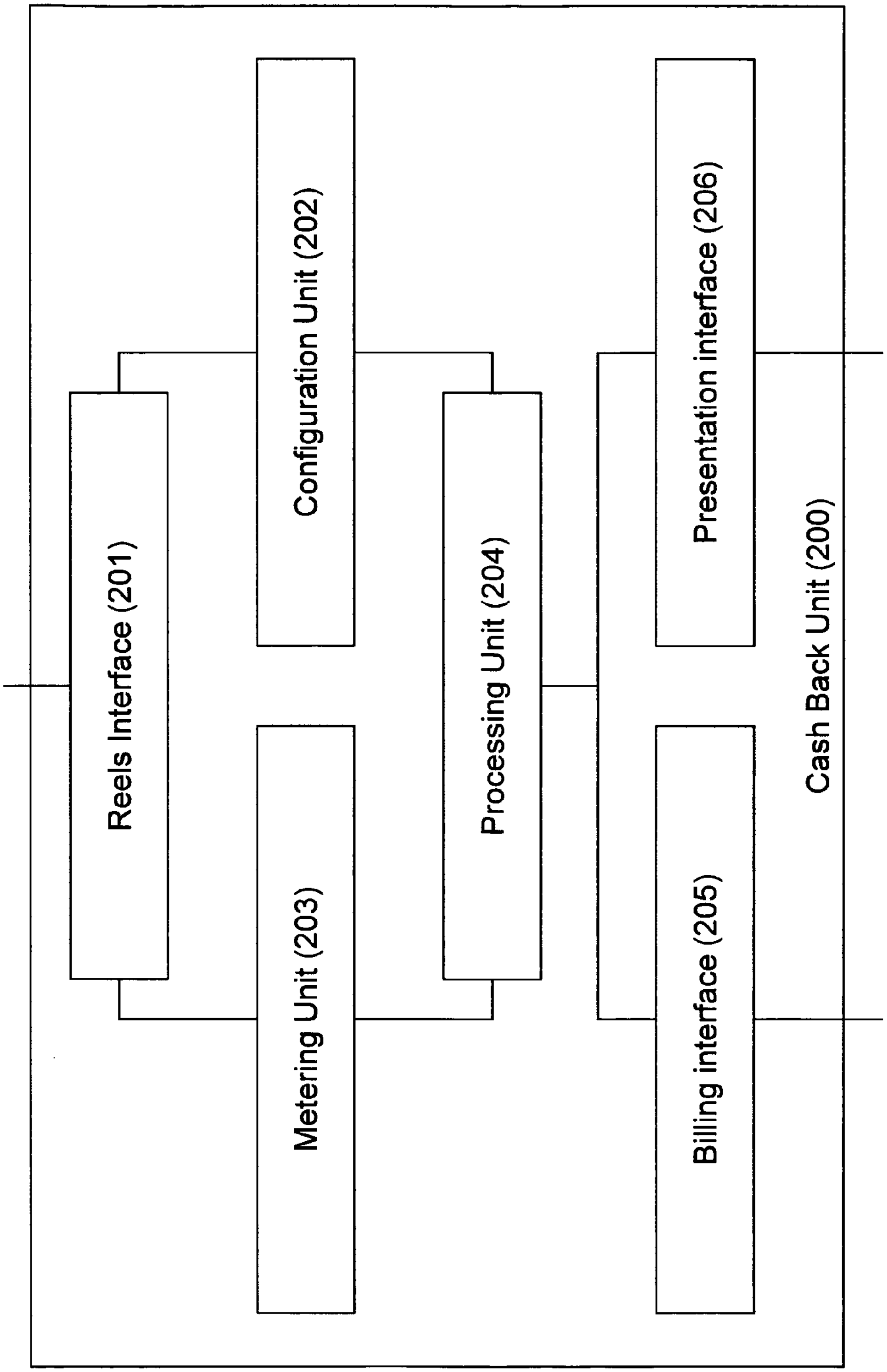
FIG. 2 is a generalized functional block diagram illustrating an example of a cash-back unit in accordance with the presently disclosed subject matter.

Referring now to FIG. 2, there is provided a generalized functional diagram of an exemplified cash-back unit in accordance with the presently disclosed subject matter.

The cash-back unit 200 comprises a configuration unit 202 adapted to accommodate configuration data related to the cash-back function. The configuration data include definition of one or more combinations of symbols to be used for the cash-back function (referred to hereinafter as cash-back combinations), the definitions may be pre-defined in the system and/or provided by a user; one or more cash-back triggering numbers N of sequential non-winning reels' spins with regard to each cash-back combination; rules and parameters for cash-back calculating with regard to each cash-back combination (e.g. multiplier Y, multipliers $Y_i$ corresponding to different triggering numbers $N_i$, etc.). By way of non-limiting example, the combination of symbols for cash-back function (cash-back combination) can be defined as any line of a slot game, horizontal and/or vertical and/or diagonal line(s) of a slot game, certain intersection of rows and columns, one or more reels in a slot game, etc.

One or more cash-back combinations can be defined to be identical to the combinations of symbols defined for basic operation of the respective reel game or otherwise. For each cash-back combination of symbols differing from a combination defined in the basic operation of the reel game, the configuration unit also accommodates a respective cash-back winning combination. Optionally, the cash-back winning combination can be configured differently from the winning combination defined in the basic operation of the reel game also if the cash-back combination is identical to combination in the basic operation of the reel game. Cash-back winning combinations can vary for different cash-back combinations. Alternatively, the winning cash-back combination may be identical for all cash-back combinations or part thereof.

The cash-back unit further comprises a reels interface 201 adapted to obtain data related to output of the reel spins. In certain embodiments, the data can include outcomes of the reel-game (e.g. data indicating which line(s) or other combination(s) has won, indication of winning events with respect to given combinations, etc). Alternatively or additionally, the data can include the actual combinations of symbols resulting from the spin of the reels, wherein a processor unit 204 calculates the outcome in accordance with symbols corresponding to the cash-back combination and the cash-back winning combination accommodated in the configuration unit 202.

Metering unit 203 is operatively coupled to the reels interface 201 and to the processor unit 204 and is adapted to assess non-winning outcomes with regard to each cash-back combination of symbols. In certain embodiments, different cash-back combinations of symbols can be provided with dedicated metering units. Additionally or alternatively, a single metering unit can provide assessment for several combinations of symbols. By way of non-limiting example, if the cash-back combination of symbols is "any line" in a certain set of lines, the metering unit assesses non-winning outcomes for each line in the set. Optionally, each line and/or groups thereof can be provided with a dedicated metering unit. By way of another non-limiting example, if the cash back combination is "any combination of predefined number of scattering symbols", the metering unit assesses non-winning outcomes for all combinations with the pre-defined number of scattering symbols.

The metering unit 203 is further operatively coupled to a presentation interface 206 adapted to facilitate displaying the cash-back related data. By way of non-limiting example, the graphical presentation of the cash-back function can have a dedicated cash-back gauge showing the current cash-back status per each combination (e.g. difference between the number of non-winning outcomes and the triggering number for each line). Amount of credits collected per respective line (or other combination) can be presented by a pop hovering over the respective dedicated gauge. In accordance with data received from the metering unit, the gauge will keep raising as long as there is no winning events with respect to the line (or other combination). A dedicated presentation meter can present collecting the bet per line on every spin.

The metering unit 203 is further configured to initiate cash-back payment (or other award) once the number of non-winning reel spins with regard to a certain combination of symbols reaches the cash-back triggering number N corresponding to the combination. The term "initiating cash-back award" used in this patent specification should be expansively construed to include informing the billing server about matching the cash-back triggering number for certain combination of symbols (with or without providing the gaming server with calculated cash-back amount) and/or requesting the billing server for cash-back transaction per amount calculated by the cash/back unit, and/or other action necessary for activating cash-back payment per achieving the cash-back triggering number. The metering unit is operatively coupled to the billing interface 205 configured to facilitate the initiation of the cash-back payment. The amount to be paid can be calculated by the cash-back unit and/or by the billing server in accordance with data received from the cash-back unit.

The metering unit is further configured to reset assessment for a certain combination of symbols upon triggering the cash-back function with respect to this combination or after a winning outcome with respect to combination.

Those versed in the art will readily appreciate that the invention is not bound by the specific architecture described with reference to FIGS. 1 and 2; equivalent functionality can be consolidated or divided in another manner. In different embodiments of the presently disclosed subject matter, the functional units and/or parts thereof can be placed in a single or in multiple geographical locations (including duplication for high-availability); operative connections between the units and within the units can be implemented directly or indirectly, including remote connection. The connection can be provided via Wire-line, Wireless, cable, Internet, Intranet, power, satellite or other networks and/or using any communication standard, system and/or protocol and variants or evolution thereof. The invention can also be practiced in distributed computing environments. The gaming system of the present invention can be also fully or partly integrated with different devices, including $3^{rd}$ party equipment.

Those skilled in the art will also readily appreciate that the storage unit and the accommodated data can be divided between different parts of the gaming system in various manners. The accommodated data or part thereof can also be shared with other party systems, including 3rd party equipment.

Figure 3:
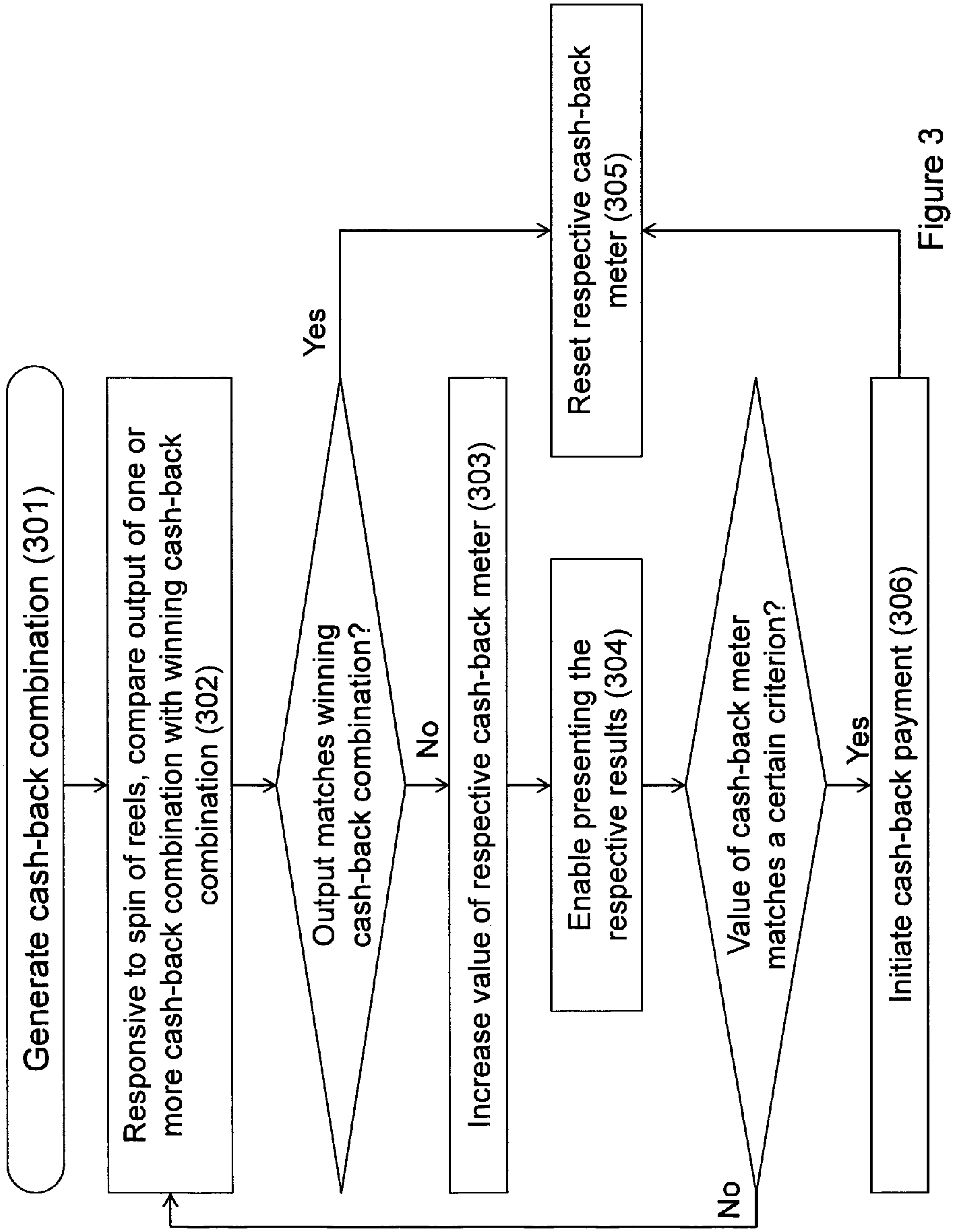
FIG. 3 is a generalized flow chart illustrating an example of operating the cash-back unit in accordance with the presently disclosed subject matter.

Referring now to FIG. 3, there is provided a generalized flow chart of the exemplified operation of the cash-back unit in accordance with the presently disclosed subject matter.

Generating (301) the cash-back combination may be provided by pre-defining the combination in the system and/or by selecting by a player. The cash-back combination may be generated as corresponding to the combination defined in the basic operation of the respective reel game (e.g. as "all lines" combination selected in the basic operation of the reel game) or differently. Responsive to each spin of the reels, the cash-back unit obtains (302) results of matching the spin output related to the cash-back combination to winning cash-back combination. In certain embodiments, for example when the cash-back combination and the winning cash-back combination are identical to respective combinations defined in the basic operation of the reel game, the cash-back unit can obtain the results of matching as an outcome (information indicative of winning/non-winning event) of the basic operating of the reel game. Alternatively or additionally, the cash-back unit may receive output of the related spin and analyze the matching by itself.

The cash-back unit provides assessment of non-winning outcomes with regard to each cash-back combination of symbols. If the output corresponding to a given cash-back combination does not match the winning cash-back combination, the cash-back unit increases (303) the value of the respective meter configured to measure the number of consecutive non-winning events with respect to the given cash-back combination. The cash-back unit further enables presenting (304) data (and/or derivatives thereof) related to respective assessment results (as illustrated by way of non-limiting example in FIGS. 4-6). Optionally, the cash-back unit can calculate and facilitate presentation of the expected cash-back payment (or other award) responsive to each spin of the reels.

The cash-back unit repeats operations 302-304 responsive to each spin of the reels. When the value of the respective meter matches a certain criteria (e.g. the number of consecutive non-winning events with respect to the given cash-back combination is equal to a predefined cash-back triggering number N), the cash-back unit initiates (306) the cash-back payment (or other award) and resets (305) the respective cash-back meter. The respective cash-back meter is also reset (305) when the given cash-back combination matches the winning cash-back combination.

By way of non-limiting example, if the cash-back combination is "any line", the cash-back unit can be configured to obtain, for each spin of the reels, matching results corresponding to each line, and to, accordingly, update the cash-back meter(s) with respect to each line. If, in the basic operation of the reel game, the combination is also "any line" and the cash-back winning combination is identical to the winning combination defined in the basic operation of the reel game, the cash-back meter(s) can be updated in accordance with the respective outcome of the basic operation of the reel game. Once the meter of a given line reaches the predefined cash-back triggering number N of sequential non-winning outcomes, the cash-back unit initiates cash-back payment, and the player is able to get back the respective amount of credits collected per respective line. For example, if N=50, Bet per Line (BPL)=10 credits, and the value of cash-back meter corresponding to lines # 12 and 20 achieves 50, the cash-back payment will be 1000 credits (50×10 BPL×2 lines=1000). Cash-back calculations may be provided in more complicated way; for example with a constant multiplier Y, with variable N and Y depending on the combination, certain game events, etc.

Figure 4:
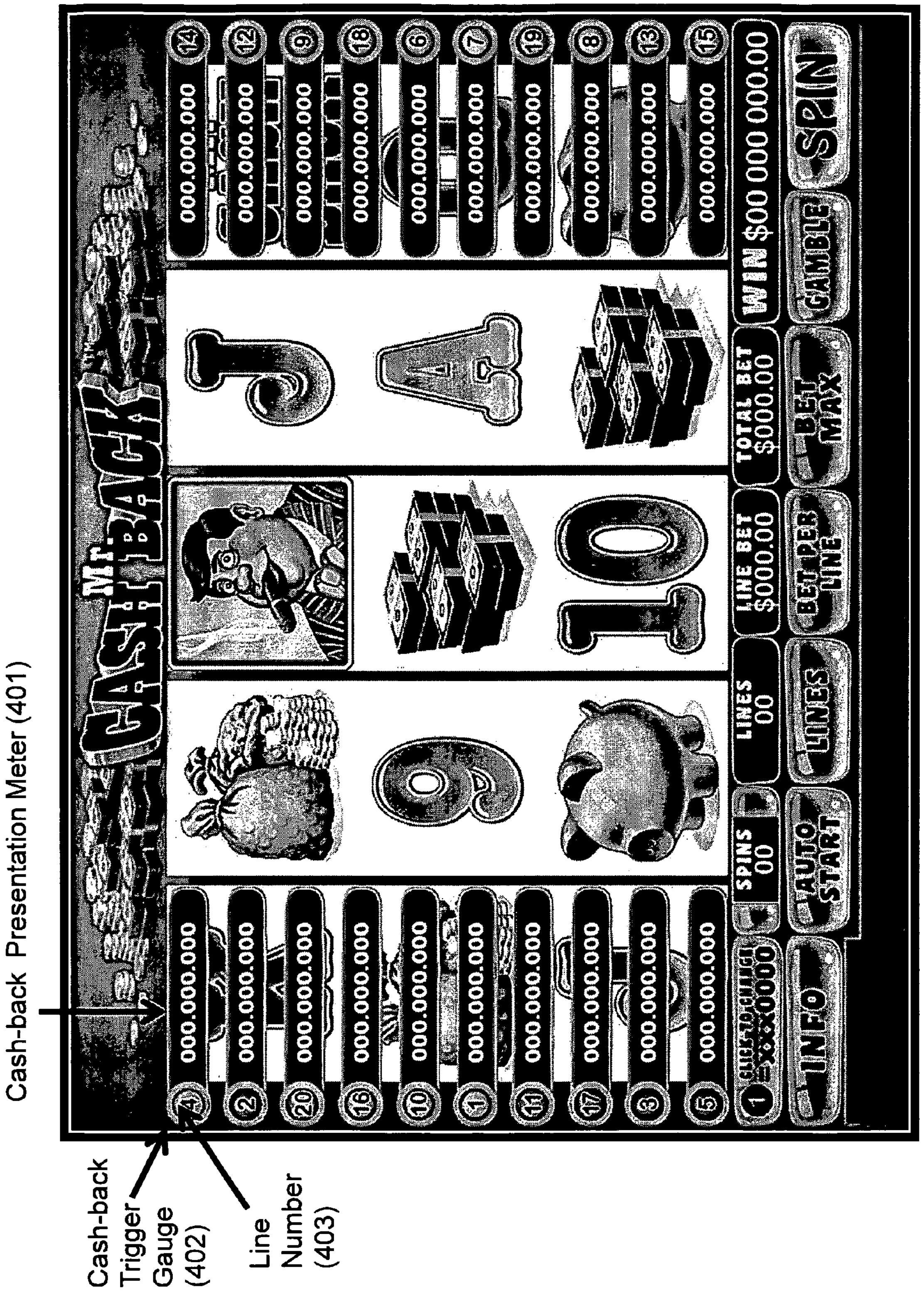
FIGS. 4-6 illustrate exemplified screens presenting the cash-back function in accordance with certain embodiments of the presently disclosed subject matter.
Figure 5:
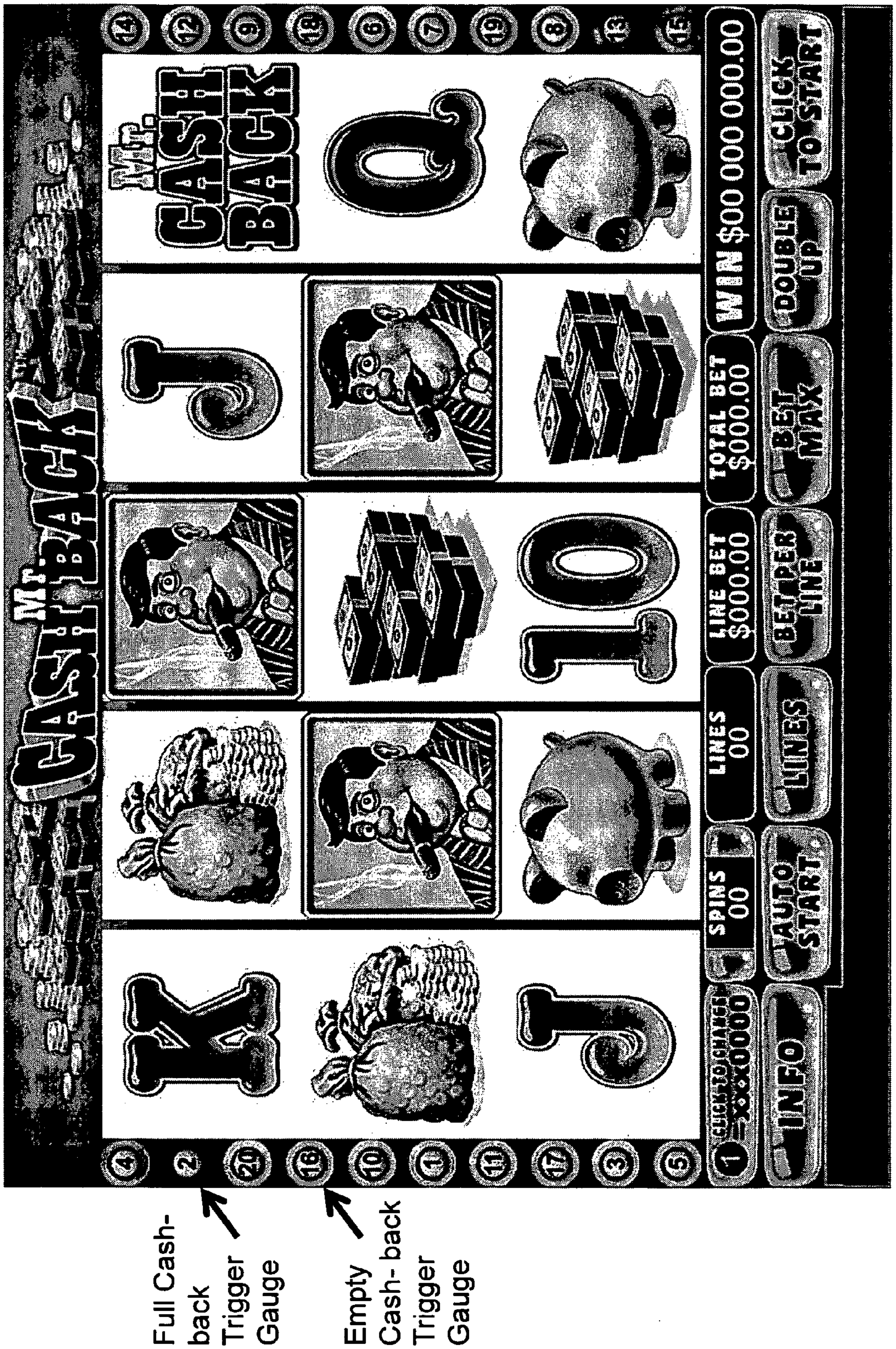
Figure 6:
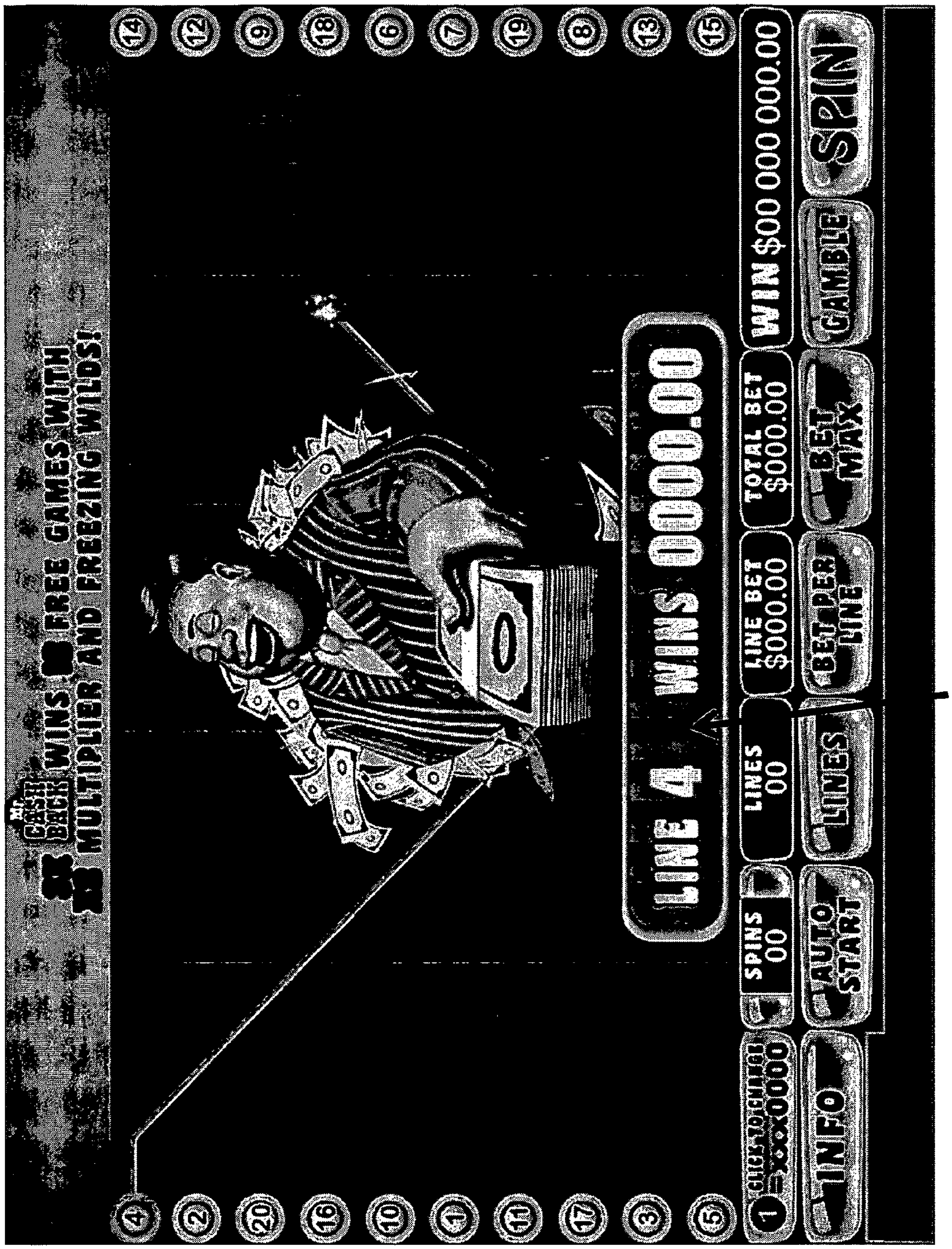

FIGS. 4-6 illustrate non-limiting examples of exemplified screenshots presenting the cash-back function in accordance with the presently disclosed subject matter. In the illustrated exemplified screenshots, the cash-back presentation meter 401 shows the amount of credits collected on a reference line. Cash-back Trigger Gauge 402 surrounding line number 403 is a visual display of the trigger status of each given line. The more full/red the gauge is, the closer the cash-back trigger is. Each spin with non-winning combination on the given line will fill in the gauge a step more, the gauge will be full/red once all N consecutive spins are done without any winning combination with respect to the given line, and the cash-back payment will be initiated. If a win combination occurs before N spins, the gauge and the cash-back presentation meter are reset to zero start point. Line Numbers 403 shows the numbers of the lines selected as the cash-back combinations.

It will also be understood that the system according to the invention can be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a computerized reel-based gaming system, the gaming system including one or more gaming machines, each gaming machine having at least one input device, at least one processor, and at least one slot machine reel, the method comprising:

responsive to a spin of the reels, automated obtaining a result of matching between the spin output corresponding to a cash-back combination and a winning cash-back combination, thus, in case of a mismatch, giving rise to a non-winning event;

automated assessing by a processor a number of consecutive non-winning events with respect to said winning cash-back combination; and automated initiating a cash-back award to a gaming machine once the number of consecutive non-winning events for said gaming machine reaches a cash-back triggering number corresponding to said winning cash-back combination, wherein the method operates with at least one of the following configurations:

the cash-back combination of symbols is configured differently from a combination of symbols configured in a basic operation of the reel game; and the cash-back winning combination is configured differently from the winning combination configured in the basic operation of the reel game.

2. The method of claim 1, wherein assessing the number of consecutive non-winning events with respect to the cash-back combination comprises:

assigning to said winning cash-back combination a meter configured to measure the number of consecutive non-winning events with respect to said winning cash-back combination;

increasing a value of the meter responsive to a non-winning event with respect to said winning cash-back combination; and resetting the meter responsive to a winning event with respect to said winning cash-back combination and/or upon initiating the cash-back award.

3. The method of claim 1, wherein obtaining the result of matching and assessing the number of consecutive non-winning events is provided responsive to each spin of the reels.

4. The method of claim 1, wherein at least one cash-back combination is selected from a group comprising horizontal lines of a slot game, vertical lines of a slot game, diagonal lines of a slot game, combinations of horizontal and/or vertical and/or diagonal lines of a slot game, and intersections of lines of a slot game.

5. The method of claim 1, wherein at least one cash-back combination is "any line" among a certain set of lines, and assessing the number of consecutive non-winning events is provided for each line in the set.

6. The method of claim 1, wherein at least one cash-back combination is "any combination of predefined number of scattering symbols", and assessing the number of consecutive non-winning events is provided for all combinations of a pre-defined number of scattering symbols outputs.

7. A computer program embodied on a non-transitory computer readable medium and comprising computer program code means for performing all the steps of claim 1, when said program runs on a computer.

8. A computerized reel-based gaming system comprising:

a) one or more gaming machines, each gaming machine including at least one input device, at least one processor, and at least one slot machine reel;

b) a configuration unit configured to implement at least one of the following:

i) one or more cash-back combinations of symbols configured differently from the winning combinations configured in the basic operation of a reel game;

ii) one or more groups each comprising a cash-back combination of symbols differing from a combination configured in the basic operation of the reel game and cash-back winning combination corresponding thereto;

c) a reel interface configured to obtain data related to output of the reel spins of a gaming machine, and indicative of non-winning events; and d) a metering unit operatively coupled to the reel interface and configured i) to assess a number of consecutive non-winning events of a gaming machine with respect to a winning cash-back combination, and ii) to initiate a cash-back award to a gaming machine once the number of consecutive non-winning events reaches a cash-back triggering number corresponding to said winning cash-back combination.

9. The system of claim 8, wherein the metering unit further comprises at least one meter configured:

to increase its value responsive to a non-winning event with respect to said winning cash-back combination; and to reset its value responsive to a winning event with respect to said winning cash-back combination or upon initiating the cash-back award.

10. The system of claim 8, wherein the metering unit comprises a plurality of meters, each meter being configured to provide operations a) and b) with respect to a pre-defined winning cash-back combination respectively assigned to the meter.

11. The system of claim 8, further comprising a presentation interface operatively coupled to the metering unit and configured to enable displaying assessing results and/or derivatives thereof.

12. The system of claim 8, wherein the metering unit is configured to receive from the reel interface a result of matching between the spin output corresponding to a cash-back combination and said winning cash-back combination, and to assess the number of consecutive non-winning events responsive to each spin of the reels.

13. A computerized cash-back unit for use in conjunction with a computerized reel-based gaming system, the gaming system including one or more gaming machines, each gaming machine having at least one input device, at least one processor, and at least one slot machine reel, the cash-back unit comprising:

a) a configuration unit configured to implement at least one of the following:

i) one or more cash-back combinations of symbols configured differently from a combination of symbols defined in a basic operation of a reel game;

ii) one or more cash-back winning combinations configured differently from the winning combinations configured in the basic operation of the reel game; and iii) one or more groups each comprising a cash-back combination of symbols differing from a combination configured in the basic operation of the reel game and cash-back winning combination corresponding thereto;

b) a reel interface configured to obtain, responsive to a spin of the reels of a gaming machine, a result of matching between the spin output corresponding to at least one cash-back combination and said at least one winning cash-back combination, thus, in case of a mismatch, giving rise to a non-winning event; and c) a metering unit operatively coupled to the reel interface and configured i) to assess a number of consecutive non-winning events of a gaming machine with respect to said at least one winning cash-back combination, and ii) to initiate a cash-back award to be provided to a gaming machine once the number of consecutive non-winning events reaches a cash-back triggering number corresponding to said winning cash-back combination.

14. The cash-back unit of claim 13, wherein the metering unit further comprises at least one meter configured:

to increase its value responsive to a non-winning event with respect to said winning cash-back combination; and to reset its value responsive to a winning event with respect to said winning cash-back combination or upon initiating the cash-back award.

15. The cash-back unit of claim 13, comprising a plurality of meters, each meter being configured to provide operations a) and b) with respect to a certain pre-defined winning cash-back combination respectively assigned to the meter.

16. The cash-back unit of claim 13, further comprising a presentation interface operatively coupled to the metering unit and configured to enable the gaming system to display the assessing results and/or derivatives thereof.

17. The cash-back unit of claim 13, wherein the metering unit is configured to receive from the reel interface a result of matching, and to assess the number of consecutive non-winning events responsive to each spin of the reels.

18. The cash-back unit of claim 13, wherein the metering unit is configured to assess the number of consecutive non-winning events for a plurality of winning cash-back combinations, and to initiate the cash-back award once the number of consecutive non-winning events corresponding to at least one winning cash-back combination reaches a respective cash-back triggering number.

19. The cash-back unit of claim 13, wherein the reel interface is configured to receive from the game system information indicative of a non-winning event which occurred in the reel game, thereby obtaining the result of matching between the spin output corresponding to the cash-back combination and the winning cash-back combination.

20. The cash-back unit of claim 13, wherein at least one cash-back combination is “any line” among a certain set of lines, and the metering unit is configured to assess the number of consecutive non-winning events for each line in the set.

* * * * *